United States Patent
Steinbach

(10) Patent No.: US 8,332,810 B2
(45) Date of Patent: Dec. 11, 2012

(54) OPTIMAL CODE GENERATION FOR DERIVATION TABLES

(75) Inventor: Klaus Steinbach, Heidelberg-Kirchheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1052 days.

(21) Appl. No.: 12/276,602

(22) Filed: Nov. 24, 2008

(65) Prior Publication Data

US 2010/0131919 A1   May 27, 2010

(51) Int. Cl.
G06F 9/44 (2006.01)
(52) U.S. Cl. ........................................ 717/106
(58) Field of Classification Search .................... 717/106
See application file for complete search history.

(56) References Cited

U.S. PATENT DOCUMENTS

| | | | | |
|---|---|---|---|---|
| 5,193,192 A | * | 3/1993 | Seberger | 717/143 |
| 5,568,568 A | * | 10/1996 | Takizawa et al. | 382/220 |
| 5,937,188 A | * | 8/1999 | Freeman | 717/104 |
| 6,356,864 B1 | * | 3/2002 | Foltz et al. | 704/1 |
| 2003/0055799 A1 | * | 3/2003 | Starzyk | 706/27 |
| 2007/0294670 A1 | * | 12/2007 | Hisaki | 717/120 |
| 2008/0046799 A1 | * | 2/2008 | Geller et al. | 714/777 |
| 2008/0141227 A1 | * | 6/2008 | Waters et al. | 717/140 |
| 2008/0288929 A1 | * | 11/2008 | He et al. | 717/153 |

OTHER PUBLICATIONS

Peng et al. "IntClust: A Software Package for Clustering Replicated Microarray Data", 2006, IEEE.*
Huber et al. "On Entropy Approxilllation for Gaussian Mixture Randolll Vectors", Aug. 20-22, 2008, IEEE.*
Mitchell, T. , "Decision Tree Learning" (Chapter 3) in Machine Learning, McGraw Hill Higher Education, Oct. 1, 1997, pp. 55-60.

* cited by examiner

*Primary Examiner* — Wei Zhen
*Assistant Examiner* — Junchun Wu
(74) *Attorney, Agent, or Firm* — Blakely, Sokoloff, Taylor & Zafman LLP

(57) ABSTRACT

A set order that most efficiently separates a set of output vectors of a derivation table is iteratively determined for a set of input vectors belonging to the derivation table. Code is generated to evaluate the input vectors in the set order.

15 Claims, 2 Drawing Sheets

OPTIMAL CODE GENERATION FOR DERIVATION TABLES

FIELD

Embodiments described herein relate to source code generation and more particularly to derivation tools used in generating source code.

BACKGROUND

In enterprise business systems, it is frequently advantageous to provide customization tools that allow a customer to define the behavior of certain software components without changing the underlying source code. One way to customize the behavior of a system component is through the use of a derivation table. A derivation table assigns an input vector to an output vector. The derivation is performed while running the relevant software component or application. Typically, the customizing of the rules in the derivation table is done once at a customizing point in time (e.g., customization is static). In other words, a derivation table can be understood as a function which maps an input set to an output set.

When generating source code, the order of input values (e.g., input vectors) to be analyzed or processed by a given application or program can influence the efficiency and/or effectiveness of the processing or analyzing.

SUMMARY OF THE DESCRIPTION

A set order that most efficiently separates a set of output vectors of a derivation table is iteratively determined for a set of input vectors belonging to the derivation table. Code is generated to evaluate the input vectors in the set order.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein described various embodiments and implementations of the invention, and do not necessarily all refer to the same embodiment. However, they are also not necessarily mutually exclusive.

DETAILED DESCRIPTION

As provided herein, methods, apparatuses, and systems provide derivation tools to be used in generating efficient source code. In various embodiments, the derivation tools allow a customer to customize various components used in a software system (e.g., an enterprise business system).

As used herein, a derivation table DT defines a function which maps an input vector $i \in I$ to an output vector $o \in O$:

$$DT: I \mapsto O$$

The input vector $i \in I$ corresponds to the n input columns of the derivation table, so that:

$$i = \begin{pmatrix} i_1 \\ \vdots \\ i_n \end{pmatrix}, i \in I$$

and the output vector $o \in O$ corresponds to the m output columns of the derivation table, so that:

$$o = \begin{pmatrix} o_1 \\ \vdots \\ o_m \end{pmatrix}, o \in O$$

For the number of rows of the derivation table, the following applies:

$$|DT| = |I| \geq |O| \text{ and } |O| = \sum_{o \in O} |o|$$

where $|o|$ defines the absolute frequency of the output vector $o \in O$ in the derivation table DT. The probability of an output vector $o \in O$ is therefore $$p_o = \frac{|o|}{|O|}$$

with bias $$p_i = \frac{1}{|I|} \forall i \in I.$$

Figure 1:
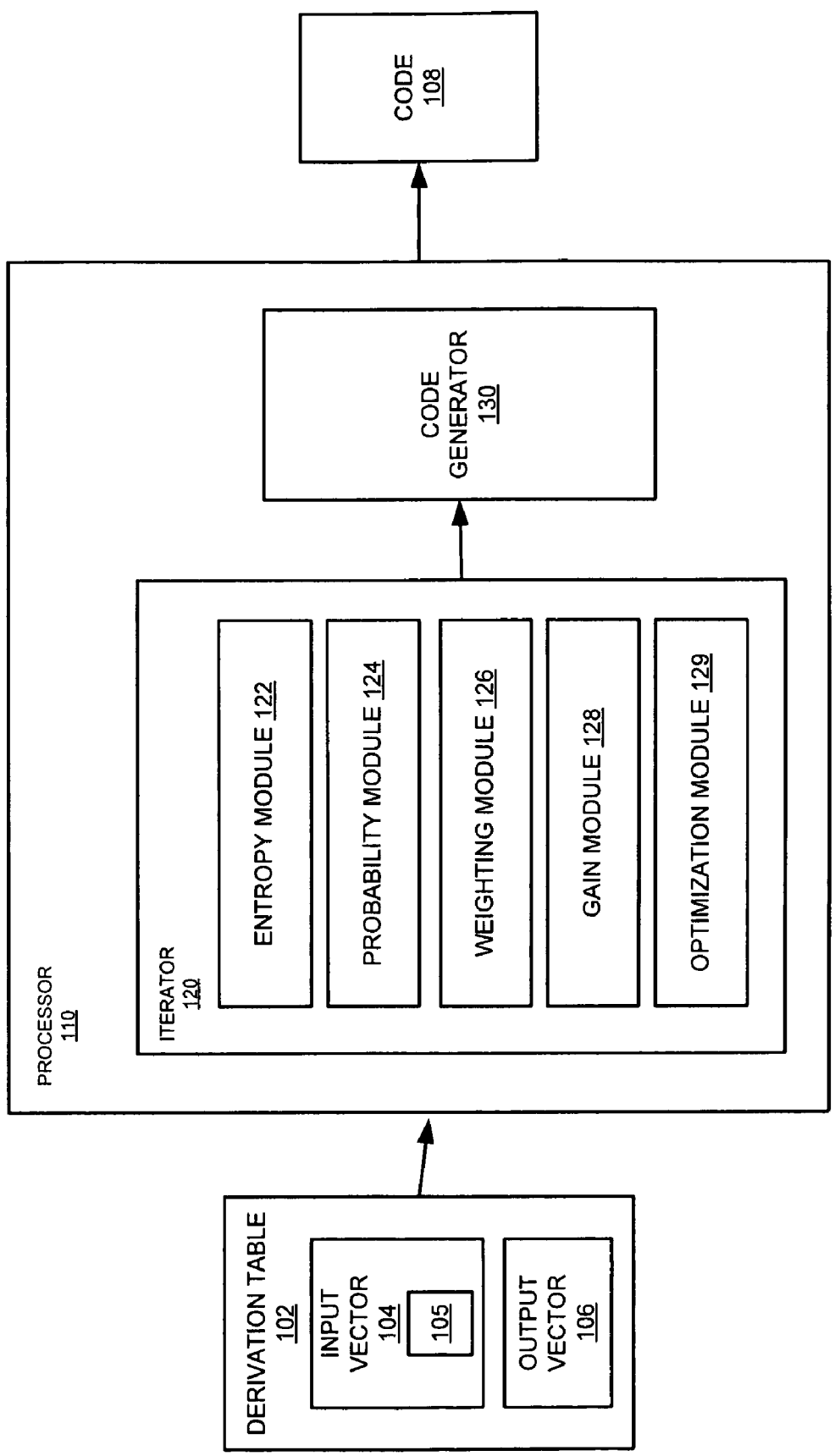
FIG. 1 is a block diagram illustrating a system according to various embodiments.

FIG. 1 is a block diagram illustrating a system according to various embodiments. Processor 110 may be a component of a larger system, such as a business system or an enterprise business system. Processor 110 includes an iterator 120 and a code generator 130 which are used in combination to produce efficient code 108. In particular, iterator 120 receives a set of input vector components 105 of a derivation table 102. Iterator 120 determines a set order for the input vector components 105 that most efficiently separates a set of output vectors 106. This set order is a tree structure in various embodiments. In other words, the set order facilitates optimal processing of the derivation table 102. Based on the set order, code generator 130 generates code (e.g., source code) that evaluates the input vectors in the set order.

In various embodiments, each input vector and each output vector is a column of values in the derivation table 102. Input and output vectors could be rows in derivation table 102 in other embodiments.

As an illustration, a customer may desire to process a given set of inputs to determine a particular output. For example, a customer may desire to analyze and/or improve the rate of booking of business transactions in a business software environment. In such an example, the customer may wish to determine which type of balance sheet should be used to post a particular business transaction. This determination can depend on a variety of factors including, but not limited to, the type of business transaction, the legal entity involved, etc. These factors can be classified as inputs or input vector components 105. The order in which the inputs are processed or analyzed affects the runtime efficiency of the source code that does the determining. For example, if the input vector associated with the legal entity is ordered first in the source code, the efficiency of the source code in calculating and/or processing the desired output may be increased. Thus, iterator 120 is responsible for determining which input vector component should be processed or analyzed first to most efficiently arrive at an output value.

Iterator 120 determines the set order of input vector components 105 using an entropy module 122, a probability module 124, a weighting module 126, a gain module 128 and an optimization module 129. In various embodiments, weighting module 126 weights the input vector components 105 according to usage statistics. In other words, those input vector components that are used more frequently (based on a sampling of usage data) should be given greater weight. In other embodiments, weighting module 126 gives each of the input vector components the same weight according to $$p_i = \frac{1}{|I|} \forall i \in I.$$

Probability module 124 computes a probability for each output vector in the set of output vectors 106 based on the weighted input vector components 105. In various embodiments, the probability is determined according to $$p_o = \sum_{i \in I} q_o(i) \text{ with}$$

$$q_o(i) = \begin{cases} p_i, & \text{if } DT(i) = o \\ 0, & \text{otherwise} \end{cases}$$

Entropy module 122 computes an entropy value for derivation table 102 in view of the weights and probabilities. Entropy module 122 may also compute and entropy value for a sub-derivation table if input vector components 105 have fixed values. As commonly used in information theory, the term entropy measures the homogeneity of a collection of examples. More particularly, entropy is a measure of the uncertainty associated with a random variable. In various embodiments, the entropy may be given by:

$$E(DT) = -\sum_{o \in O} p_o \cdot \log_2(p_o) \leq \log_2(|O|)$$

Gain module 128 calculates the information gain for each of the input vector components 105 resulting from the entropy calculation for derivation table 102. In various embodiments, the information gain $$G(DT, i_x) = E(DT) - \sum_{v \in I_x} \frac{|DT_{i_x=v}|}{|DT|} \cdot E(DT_{i_x=v})$$

defines the information benefit of selecting component x of the input vector i. In various embodiments, optimization module 129 selects the input vector component with the largest information gain to be first in the ordered set of input vector components according to $$i_{x^*} = \underset{i_x}{\operatorname{argmax}} G(DT, i_x)$$

$$i_{x^*} = \underset{i_x}{\operatorname{argmin}} \sum_{v \in I_x} \frac{|DT_{i_x=v}|}{|DT|} \cdot E(DT_{i_x=v}).$$

In some embodiments, only the input vector component with the largest information gain is ordered (e.g., as the first entry). In other embodiments, the remaining input vector components may be subsequently ordered based on the calculated information gain for each input vector component.

Based on the selection and/or ordering by optimization module 129, code generator 130 automatically generates code expressions to result in the most efficient runtime of the source code.

Figure 2:
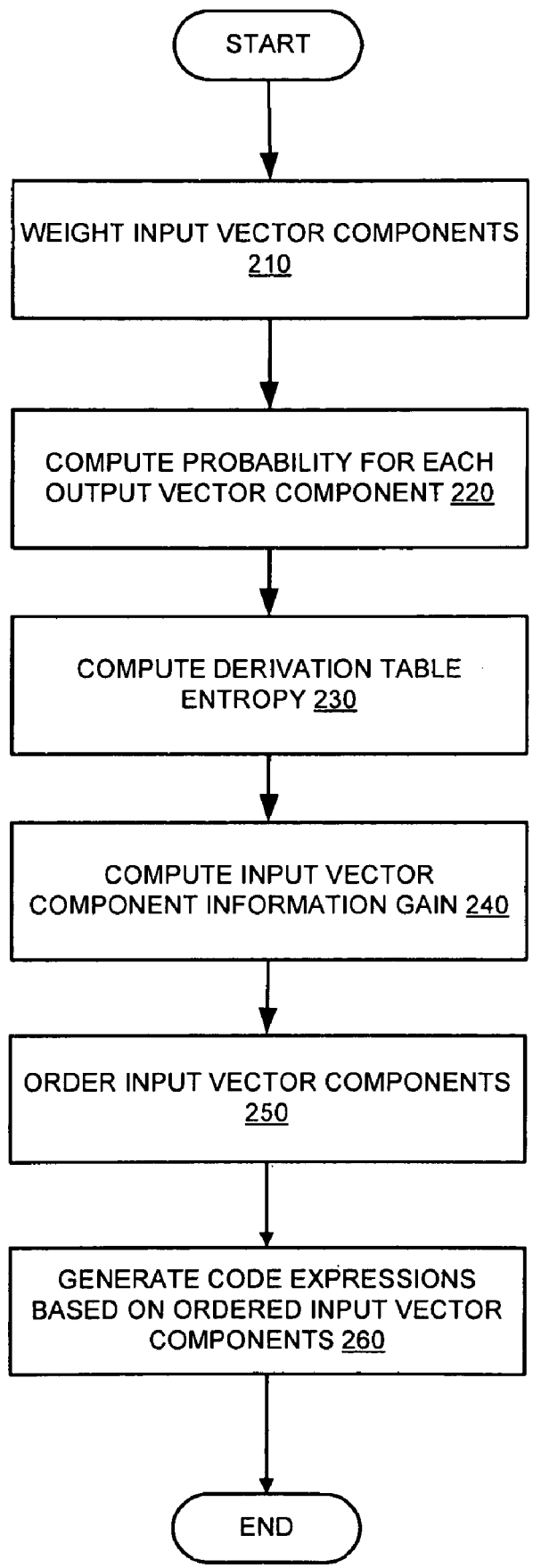
FIG. 2 is a flow diagram of operation in a system according to various embodiments.

FIG. 2 is a flow diagram of operation in a system according to various embodiments. For a given derivation table having input vector components and output vector components, the input vector components are weighted 210, for example, based on frequency of use for each input vector component. Alternatively, each of the input vector components are given the same weight according to $$p_i = \frac{1}{|I|} \forall i \in I.$$

Using the weighted input vector components, a probability for each output vector component is computed 220, taking into account the weighting of the input vector components. In various embodiments, the probability for each output vector component is computed according to the following:

$$p_o = \sum_{i \in I} q_o(i) \text{ with}$$

$$q_o(i) = \begin{cases} p_i, & \text{if } DT(i) = o \\ 0, & \text{otherwise} \end{cases}$$

Using the weighted input vector components and the computed probabilities for the output vector components, an entropy value is computed 230 for the derivation table. In various embodiments, the entropy may be given by:

$$E(DT) = -\sum_{o \in O} p_o \cdot \log_2(p_o) \leq \log_2(|O|)$$

An information gain for each of the input vector components in the derivation table is also computed 240. In various embodiments, the information gain $$G(DT, i_x) = E(DT) - \sum_{v \in I_x} \frac{|DT_{i_x=v}|}{|DT|} \cdot E(DT_{i_x=v})$$

defines the information benefit of selecting component x of the input vector i. The component x* to be chosen is solvable through $$i_{x^*} = \underset{i_x}{\operatorname{argmax}} G(DT, i_x)$$

$$i_{x^*} = \underset{i_x}{\operatorname{argmin}} \sum_{v \in I_x} \frac{|DT_{i_x=v}|}{|DT|} \cdot E(DT_{i_x=v})$$

Thus, based on the above calculations, the input vector components are ordered 250 according to which input vector component yields the highest information gain. In some embodiments, only the input vector component with the highest information gain is ordered (e.g., as the first entry). In other embodiments, all input vector components are ordered based on their respective amounts of information gain.

Based on the ordering of input vector components, code expressions for the source code are automatically generated 260 to result in the most efficient runtime of the source code.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory of a remote computer (e.g., a server) to a memory of a requesting computer (e.g., a client).

Various components described herein may be a means for performing the functions described herein. Each component described herein includes software, hardware, or combination of these. The operations and functions described herein can be implemented as software modules, hardware modules, special-purpose hardware (e.g., application specific hardware, application specific integrated circuits (ASICs), digital signal processors DSPs, etc.), embedded controllers, hardwired circuitry, etc.

Aside from what is described herein various modifications may be made to the disclosed embodiments and implementations of the invention without departing from their scope. Therefore, the illustrations and examples herein should be construed in an illustrative, and not a restrictive sense.

What is claimed is:

1. A method associated with a computer, the method comprising:
    iteratively determining for a set of input vectors of a derivation table a set order that most efficiently separates a set of output vectors of the derivation table by computing a derivation table entropy value; and computing an input vector component entropy value for each input vector component in the derivation table; and
    generating code to evaluate the input vectors in the set order;
    wherein the derivation table entropy value is a measure of the uncertainty associated with each value in the derivation table, and the input vector component entropy value is a measure of the uncertainty associated with each value in the input vector.

2. The method of claim 1, further comprising:
    computing a probability for each output vector in the output set.

3. The method of claim 1, wherein the computing further comprises:
    weighting the input vector components according to usage statistics.

4. The method of claim 2, wherein generating code comprises:
    automatically creating code expressions in code where the input vector components are ordered based on the derivation table entropy value, the input vector component entropy values, and the computed probabilities.

5. The method of claim 1, wherein each input vector component is a column of values.

6. A non-transitory machine accessible storage medium containing instructions that, when executed, cause a machine to:
    iteratively determine for a set of input vectors of a derivation table a set order that most efficiently separates a set of output vectors of the derivation table by causing the machine to compute a derivation table entropy value; and compute an input vector component entropy value for each input vector component in the derivation table; and
    generate code to evaluate the input vectors in the set order;
    wherein the derivation table entropy value is a measure of the uncertainty associated with each value in the derivation table, and the input vector component entropy value is a measure of the uncertainty associated with each value in the input vector.

7. The non-transitory machine accessible storage medium of claim 6, wherein the instructions further comprise instructions to cause the machine to:
    compute a probability for each output vector in the output set.

8. The non-transitory machine accessible storage medium of claim 6, wherein the computing instructions further comprise instructions to cause the machine to:
    weight the input vector components according to usage statistics.

9. The non-transitory machine accessible storage medium of claim 7, wherein the instructions causing the machine to generate code cause the machine to:
    automatically create code expressions in code where the input vector components are ordered based on the derivation table entropy value, the input vector component entropy values, and the computed probabilities.

10. The non-transitory machine accessible storage medium of claim 6, wherein each input vector component is a column of values.

11. A system, comprising:
    an iterator, implemented by a computer, to iteratively determine for a set of input vectors of a derivation table a set order that most efficiently separates a set of output vectors of the derivation table, the iterator including an entropy module to compute a derivation table entropy value; and the entropy module further to compute an input vector component entropy value for each input vector component in the derivation table; and
    a code generator to generate code that evaluates the input vectors in the set order;
    wherein the derivation table entropy value is a measure of the uncertainty associated with each value in the derivation table, and the input vector component entropy value is a measure of the uncertainty associated with each value in the input vector.

12. The system of claim 11, the iterator further comprising:
    a probability module to compute a probability for each output vector in the output set.

13. The system of 11, the iterator further comprising:
a weighting module to weight the input vector components according to usage statistics.

14. The system of 12, further comprising:
an optimization module to order the input vector components based on the derivation table entropy value, the input vector component entropy values, and the computed probabilities; and the code generator to automatically create code expressions in code according to the ordering by the optimization module.

15. The system of 11, wherein each input vector component is a column of values.

\* \* \* \* \*